US009135829B2

(12) United States Patent
Shafaat et al.

(10) Patent No.: US 9,135,829 B2
(45) Date of Patent: Sep. 15, 2015

(54) DISTANCE SEPARATION CRITERIA INDICATOR

(75) Inventors: Syed Tahir Shafaat, Everett, WA (US); Juliana J. Goh, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 523 days.

(21) Appl. No.: 12/771,703

(22) Filed: Apr. 30, 2010

(65) Prior Publication Data

US 2011/0270472 A1 Nov. 3, 2011

(51) Int. Cl.
*G01C 5/00* (2006.01)
*G05D 1/00* (2006.01)
(Continued)

(52) U.S. Cl.
CPC ............ *G08G 5/0078* (2013.01); *G08G 5/0008* (2013.01); *G08G 5/0021* (2013.01)

(58) Field of Classification Search
CPC ............ G01C 5/00; G01C 5/005; G01C 5/02; G01C 5/04; G01C 23/00; G01C 23/005; G01C 9/00; G01C 9/005; G01C 9/02; G01C 9/10; G01C 9/04; G01C 9/06; G01C 9/08; G01C 25/00; G01C 25/005; G01C 21/10; G01C 21/12; G01C 21/14; G01C 21/16; G01C 21/165; G01C 21/18; G08G 5/0004; G08G 5/0008; G08G 5/0013; G08G 5/0017; G08G 5/0021; G08G 5/0026; G08G 5/003; G08G 5/0034; G08G 5/0039; G08G 5/0078; G08G 5/0095; G08G 5/025; G08G 5/02; G08G 5/04; G08G 5/045; G08G 7/00; G08G 7/02; G08G 9/00; G08G 9/02; G08G 99/00
USPC ......... 701/4, 301, 213, 117, 120, 122, 3, 5, 6, 701/7, 8, 9, 14, 300, 302, 400, 408, 466, 701/518, 519, 520; 342/22, 29, 357.08, 342/357.09, 455, 30, 31, 32, 36, 37, 38, 39, 342/40, 41, 118, 123, 146, 121, 120; 340/961, 945, 963, 977, 964, 967, 970, 340/969, 971, 973, 974, 978, 975, 976, 340/981; 244/175, 75.1, 76 R, 180, 181, 244/182, 191, 192, 194, 195
See application file for complete search history.

(56) References Cited

U.S. PATENT DOCUMENTS 4,914,733 A * 4/1990 Gralnick ....................... 340/961
5,227,786 A * 7/1993 Hancock ....................... 340/961
(Continued)

OTHER PUBLICATIONS

Author: Steve Henely, Rockwell Collins; The Avionics Handbook Chapter 18 TACS II; de Montalk, JP Potocki. "Functions." The avionics handbook (2001); ftp://idc18.seu.edu.cn/Pub2/EBooks/Books_from_EngnetBase/pdf/8348/CH-11.pdf.*
(Continued)

*Primary Examiner* — James Trammell
*Assistant Examiner* — James E Stroud
(74) *Attorney, Agent, or Firm* — Baldauff IP, LLC; Michael J. Baldauff, Jr.

(57) ABSTRACT

Methods, systems, and computer-readable media described herein provide for the display of aircraft traffic and climb/descent information on an aircraft display. Flight data is received from a traffic aircraft in the vicinity of an ownship aircraft. Similar flight data is determined for the ownship aircraft. The flight data for the traffic aircraft and the ownship aircraft is used to determine a criteria indicator that is associated with at least the longitudinal separation and closure rate between the two aircraft. According to various embodiments, a number of altitude indication lines are displayed and an aircraft traffic indicator and ownship indicator corresponding with the traffic aircraft and ownship aircraft are displayed on the appropriate altitude indication lines. The criteria indicator is displayed so that the position of the criteria indicator with respect to the aircraft traffic indicator and ownship indicator informs a pilot as to whether an altitude change is possible.

22 Claims, 5 Drawing Sheets

(51) Int. Cl.

| | |
|---|---|
| ***G05D 3/00*** | (2006.01) |
| ***G06F 7/00*** | (2006.01) |
| ***G06F 17/00*** | (2006.01) |
| ***G08G 5/00*** | (2006.01) |

(56) References Cited

U.S. PATENT DOCUMENTS

| | | | | |
|---|---|---|---|---|
| 5,574,648 | A * | 11/1996 | Pilley | 701/120 |
| 6,064,335 | A * | 5/2000 | Eschenbach | 340/961 |
| 6,154,151 | A * | 11/2000 | McElreath et al. | 340/970 |
| 6,160,497 | A * | 12/2000 | Clark | 340/961 |
| 6,271,768 | B1 * | 8/2001 | Frazier et al. | 340/961 |
| 6,314,366 | B1 * | 11/2001 | Farmakis et al. | 701/482 |
| 6,433,729 | B1 | 8/2002 | Staggs | |
| 6,473,003 | B2 * | 10/2002 | Horvath et al. | 340/945 |
| 6,683,541 | B2 * | 1/2004 | Staggs et al. | 340/961 |
| 6,690,298 | B1 * | 2/2004 | Barber et al. | 340/971 |
| 6,703,945 | B2 * | 3/2004 | Kuntman et al. | 340/961 |
| 6,744,396 | B2 * | 6/2004 | Stone et al. | 342/36 |
| 6,826,458 | B2 * | 11/2004 | Horvath et al. | 701/3 |
| 7,282,285 | B2 * | 10/2007 | Couch et al. | 429/429 |
| 7,307,578 | B2 * | 12/2007 | Blaskovich et al. | 342/29 |
| 7,453,375 | B2 * | 11/2008 | Chamas et al. | 340/945 |
| 7,477,985 | B2 * | 1/2009 | Shirley et al. | 701/120 |
| 7,495,601 | B2 * | 2/2009 | Blaskovich et al. | 342/29 |
| 7,570,178 | B1 * | 8/2009 | Whalen et al. | 340/961 |
| 8,271,152 | B2 * | 9/2012 | Singer et al. | 701/4 |
| 2002/0075171 | A1 * | 6/2002 | Kuntman et al. | 340/961 |
| 2002/0183900 | A1 * | 12/2002 | Sainthuile | 701/4 |
| 2003/0016158 | A1 * | 1/2003 | Stayton et al. | 342/29 |
| 2003/0132860 | A1 * | 7/2003 | Feyereisen et al. | 340/973 |
| 2007/0182589 | A1 * | 8/2007 | Tran | 340/961 |
| 2007/0200731 | A1 * | 8/2007 | Winkler et al. | 340/961 |
| 2009/0267800 | A1 * | 10/2009 | Hammack et al. | 340/973 |
| 2010/0286900 | A1 | 11/2010 | Depape et al. | |
| 2011/0066362 | A1 * | 3/2011 | He | 701/120 |
| 2011/0276198 | A1 * | 11/2011 | Khatwa et al. | 701/3 |
| 2011/0316857 | A1 * | 12/2011 | Pepitone et al. | 345/467 |

OTHER PUBLICATIONS

"Helmet-Mounted Display Symbology for Ground Collision Avoidance in Fighter Aircraft"; Taylor, Jonathan B.; Massachusetts Inst of Tech Cambridge Dept of Aeronautics and Astronautics; http://oai.dtic.mil/oai/oai?verb=getRecord&metadataPrefix=html &identifier=ADA366235; retrieved Apr. 8, 2014.*

"virturalradarserver"; http://www.virtualradarserver.co.uk/; retrieved Mar. 14, 2014.*

"Ads-b virtural radar Jan. 25, 2011"; http://web.archive.org/web/20120411202253/http://www.qsl.net/vk3bjm/ads-b.htm; retrieved Mar. 14, 2014.*

"Radar virtuel dot com Apr. 18, 2009"; http://web.archive.org/web/20090418184914/http://www.radarvirtuel.com/; retrieved Mar. 14, 2014.*

"Airborne Collision Avoidance System"; Ed Williams; Senior Engineering Specialist; Airservices Australia; http://www.crpit.com/confpapers/CRPITV47Williams.pdf; retrieved on Mar. 14, 2014.*

"Virtualradarserver frequently asked questions Nov. 24, 2010"; http://web.archive.org/web/20101124040734/http://www.virtualradarserver.co.uk/FAQ.aspx; retireved: Mar. 14, 2014.*

European Search Report dated Jun. 1, 2011 for EP Application No. 11159678.9-2215.

* cited by examiner

DISTANCE SEPARATION CRITERIA INDICATOR

BACKGROUND

Every day, hundreds of aircraft fly across oceans or other airspace that is not monitored by radar. Aircraft fly within designated routes at predefined altitudes, or flight levels. A flight level indicates an altitude in hundreds of feet according to a standard pressure datum. For example, flight level (FL) 310 indicates an altitude of 31,000 feet, while FL 280 indicates an altitude of 28,000 feet. Often, pilots will want to select a cruise altitude that will optimize the performance of the aircraft in some manner. For example, the wind direction and velocity may vary between the available flight levels along the route that the aircraft is flying. The pilot may want to take advantage of a tailwind at a particular flight level to consume less fuel, which consequently may lower operating costs and reduce environmentally harmful emissions, and/or to decrease the flight time to the destination airport.

A problem when flying these oceanic routes is that due to the lack of radar coverage, the position updates must be regularly sent to an air traffic control (ATC) facility that is in communication with the aircraft at any given time. The pilots typically do not have a big picture of the traffic that is surrounding them at any given time. Any requests for changes in flight levels must be relayed to ATC, and often through multiple personnel or facilities until an accurate depiction of the surrounding traffic is determined and a decision can be made by the controller. More often than not, the request for a flight level change is denied for traffic reasons. For this reason, pilots often stop asking, which leads to inefficiencies and delays.

Automatic Dependent Surveillance-Broadcast (ADS-B) technology allows ADS-B equipped aircraft to receive flight information broadcast directly from other ADS-B equipped aircraft. This information may include identification, position, altitude, directional data, and other flight data corresponding to the current flight conditions of the broadcasting aircraft. However, while this data is useful in assisting a pilot and ATC with valuable traffic information, the pilot must still spend time analyzing the constantly changing data in order to make a determination as to whether a flight level change would possible in light of the current traffic environment.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, systems, and computer-readable media described herein provide for the display of aircraft traffic and climb/descent determination data. According to aspects presented herein, flight data is received from a traffic aircraft. Similar flight data associated with the ownship aircraft is determined, and using this flight data along with the traffic aircraft flight data, a criteria indicator is determined. The criteria indicator corresponds to at least the longitudinal separation between the traffic aircraft and the ownship aircraft, as well as to the closure rate between the two aircraft, as determined from the applicable flight data.

According to other aspects, multiple altitude indication lines are displayed on a display unit of the aircraft. An ownship representation is displayed on an altitude indication line corresponding to the current altitude of the aircraft as determined from the applicable flight data. Similarly, an aircraft traffic representation is displayed on an altitude indication line corresponding to the altitude of the traffic aircraft as determined from the traffic aircraft flight data. The criteria indicator is displayed so that the position of the criteria indicator, with respect to the positions of the ownship representation and the aircraft traffic representation, indicates whether an altitude change of the aircraft through an altitude corresponding to the altitude indication line of the traffic aircraft would be possible.

The features, functions, and advantages discussed herein can be achieved independently in various embodiments of the present disclosure or may be combined in yet other embodiments, further details of which can be seen with reference to the following description and drawings.

DETAILED DESCRIPTION

The following detailed description is directed to methods, systems, and computer-readable media for displaying aircraft traffic in a manner that allows a pilot to determine at a glance whether a climb or descent to a desired altitude is possible. This knowledge allows a pilot to request changes in altitude or flight levels during oceanic flights or in other non-radar coverage areas with relative confidence that the change will be authorized by ATC controllers.

Utilizing the concepts and technologies described herein, pilots may have readily available visual access to real time in-flight traffic information at various flight levels or altitudes around the aircraft. Pertinent flight information is collected from surrounding traffic aircraft and from the aircraft itself, and is analyzed to determine whether climbing or descending through adjacent and consecutive flight levels is possible based on the current traffic conditions in light of the safe minimum separation requirements and procedures mandated by applicable flight regulations. The current traffic environment is displayed along with the results of the climb and descent analysis in a manner that enables the pilots to view the display and at a glance, immediately know whether it is possible to climb or descend to or through a desired flight level. These and other advantages and features will become apparent from the description of the various embodiments below.

Throughout this disclosure, the terms “flight levels” and “altitudes” may be used interchangeably. As discussed above, a flight level indicates an altitude in hundreds of feet according to a standard pressure datum. It should be appreciated that the embodiments described herein are directed to flight levels since current flight operations over oceans and other non-radar coverage areas provide for flying along predefined tracks or routes at specified flight levels. However, the disclosure and associated claims are not limited to the display of aircraft traffic according to flight levels. Rather, any altitude measurements and associated terminology are contemplated.

Figure 1:
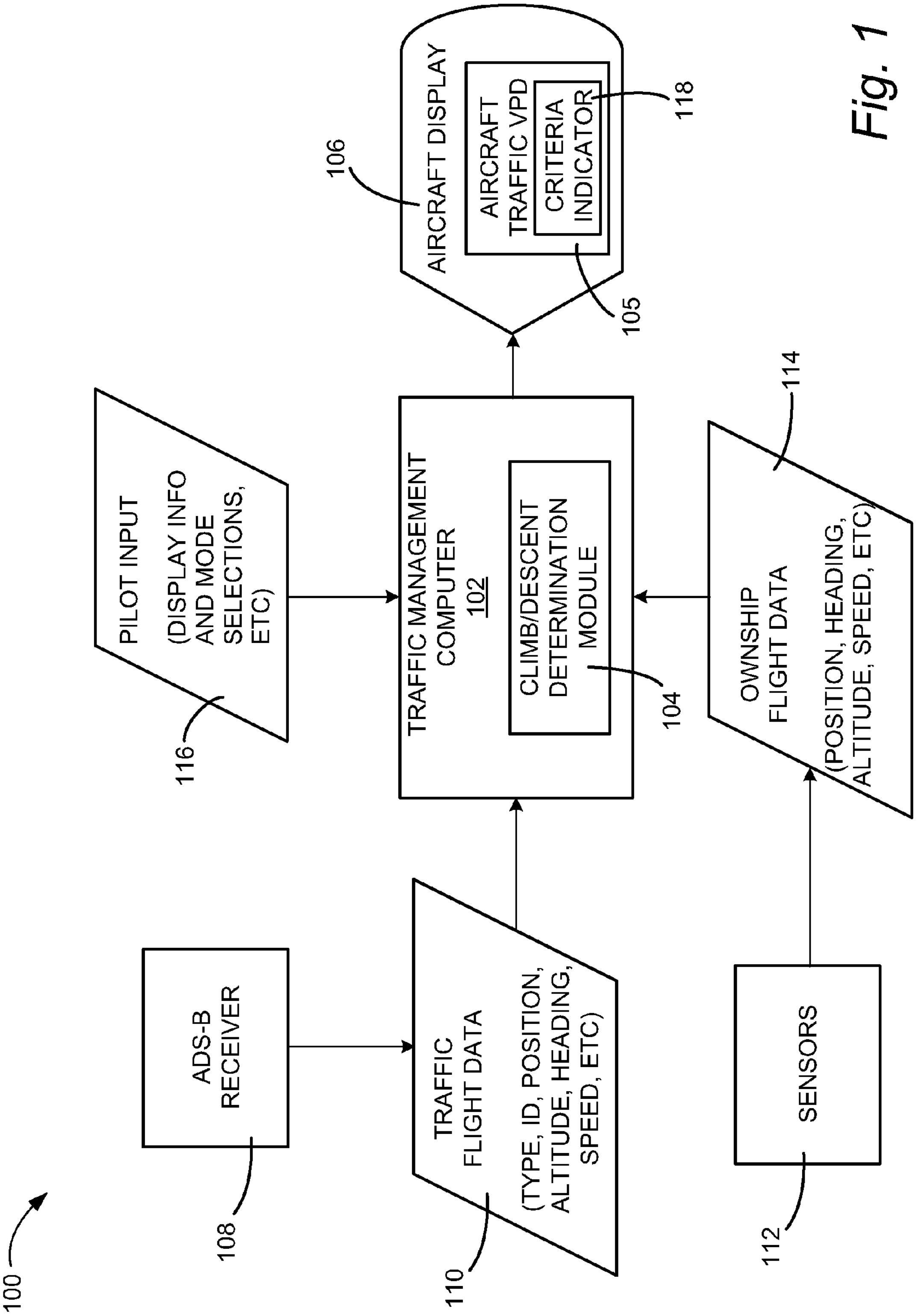
FIG. 1 is a block diagram illustrating various aspects of a climb and descent management system of an aircraft according to embodiments presented herein.

In the following detailed description, references are made to the accompanying drawings that form a part hereof and that show by way of illustration specific embodiments or examples. In referring to the drawings, like numerals represent like elements throughout the several figures. Looking now at FIG. 1, a climb and descent management system 100 may be an integrated component of a flight management system or other cockpit avionics system of an aircraft. It is in this context that the embodiments below will be described. However, according to other embodiments, the climb and descent management system 100 may be implemented in a ground-based computing system associated with ATC. In this context, the climb and descent management system provides a graphical visualization that assists controllers in visualizing aircraft positioning and separation in non-radar coverage areas.

According to various embodiments, the climb and descent management system 100 may include a traffic management computer 102 executing a climb/descent determination module 104 that creates an aircraft traffic VPD 105 on an aircraft display 106. The traffic management computer 102 may be any type of flight computer and may be either dedicated to the traffic management routines discussed herein, or a flight computer that is part of any other avionics or flight system on the aircraft. Aspects of the traffic management computer 102 will be described in greater detail below with respect to FIG. 5.

The climb/descent determination module 104 may be implemented as software, hardware, or a combination of the two and may execute on one or more processors or computing devices within the climb and descent management system 100. As will be described in greater detail below with respect to FIGS. 2-4, the climb/descent determination module 104 utilizes traffic flight data 110, ownship flight data 114, and pilot input 116 to generate the aircraft traffic VPD 105 on the aircraft display 106. According to one embodiment, the aircraft display 106 may be located in the cockpit of the aircraft and may be a graphical display, such as a multi-function display found in a modern "glass cockpit." Alternatively, the aircraft display 106 may be a computer monitor, a laptop computer display, a handheld display, or other suitable display device accessible by the climb/descent determination module 104.

The traffic flight data 110 may include any information corresponding to the current flight characteristics of each traffic aircraft broadcasting the information. For the purposes of this disclosure, the term "traffic aircraft" refers to any aircraft other than the "ownship" or "ownship aircraft," which refers to the aircraft receiving the information and providing climb/descent determination information on the aircraft traffic VPD 105 according to the embodiments described herein. Examples of the traffic flight data 110 include, but are not limited to, aircraft type, identification, position, altitude, heading, and speed. According to one embodiment, this traffic flight data 110 is received at an ADS-B receiver 108 of the ownship aircraft and provided to the traffic management computer 102. It should be appreciated that while ADS-B provides an exemplary system for providing the traffic flight data 110 from the traffic aircraft to the ownship aircraft, the concepts provided herein are not limited to the use of ADS-B technology. Rather, any current or future means for distributing flight data in real time between aircraft may be utilized without departing from the scope of this disclosure.

In addition to the traffic flight data 110 corresponding to the traffic aircraft, the traffic management computer 102 also receives ownship flight data 114 from any number of sensors 112 or flight systems associated with the ownship aircraft. Examples of the ownship flight data 114 include, but are not limited to, position, altitude, heading, and speed. Examples of sensors 112 include, but are not limited to, global positioning system (GPS) receivers, pressure sensors, and/or any avionics components or flight computers suitable for providing the ownship flight data 114. As will be described in detail below, the climb/descent determination module 104 compares and otherwise utilizes the traffic flight data 110 and the ownship flight data 114 to calculate and display criteria indicators 118 on the aircraft traffic VPD 105.

As will be shown and described below with respect to FIGS. 2 and 3, criteria indicators 118 may include horizontal lines or other symbols that indicate to a pilot whether or not a climb or descent to a desired flight level is possible in light of separation minimums. A "separation minimum" as used throughout this disclosure is a minimum longitudinal distance between aircraft as required by regulatory agencies, airline operating procedures, or any other applicable procedures or guidelines. According to various embodiments, the criteria indicators 118 include a horizontal line, the length of which is determined at least according to the closure rate and the longitudinal separation between a traffic aircraft and the ownship aircraft, in light of the altitude separation between the two aircraft, the performance (i.e. climbing) characteristics of the ownship aircraft and the desired flight level change. It should be appreciated that any number and type of variables, such as wind velocity and heading at applicable altitudes, may additionally be taken into account by the climb/descent determination module 104 when determining the criteria indicators 118 for displaying on the aircraft traffic VPD 105. The various aspects of the criteria indicators 118 will become clear in light of FIGS. 2 and 3 below.

Figure 2:
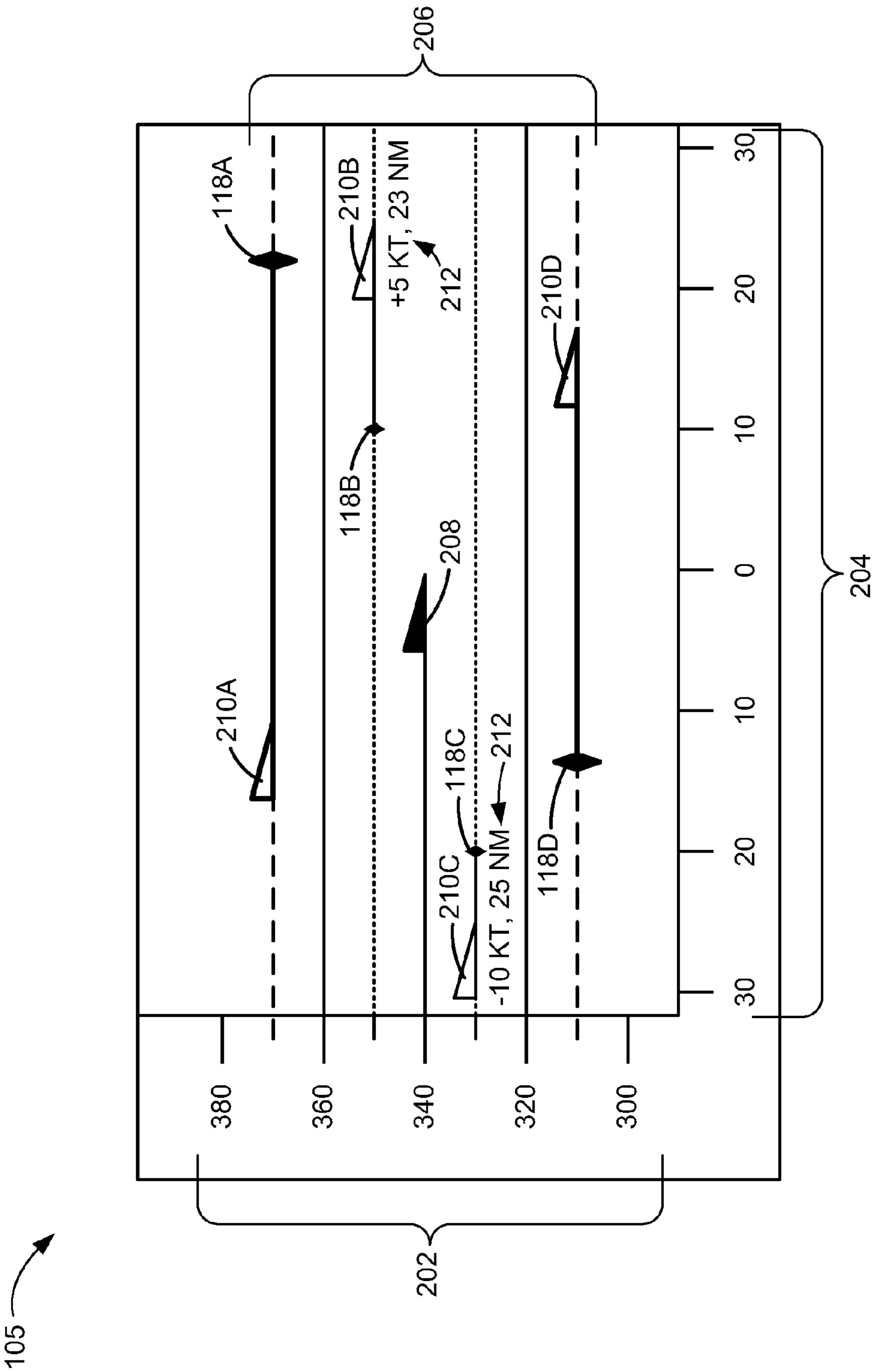
FIG. 2 is a display diagram showing an aircraft traffic vertical profile display (VPD) according to embodiments presented herein.

Turning now to FIG. 2, an illustrative aircraft traffic VPD 105 will be described, according to one embodiment of the disclosure. According to this embodiment, the aircraft traffic VPD 105 includes a graphical representation of the airspace and corresponding aircraft traffic surrounding the ownship aircraft. The vertical axis includes a number of altitudes, or flight levels 202. As mentioned above, the altitudes 30,000 feet to 38,000 feet correspond to flight levels 300 to 380. A number of altitude indication lines, or flight level indication lines 206, are displayed at the corresponding flight levels 202. The colors or other characteristics of the flight level indication lines 206 may vary according to whether climb or descent through the applicable flight level indication line 206 is allowed, as will be described in further detail below.

The horizontal axis of the aircraft traffic VPD 105 includes a number of longitudinal separation distances 204 as calculated from the ownship aircraft by the criteria indicator 118 executing on the traffic management computer 102. For example, an ownship indicator 208 is positioned in the center of the aircraft traffic VPD 105 at the longitudinal separation distance 204 of "0" on the horizontal axis. Aircraft traffic located 23 nautical miles (NM) in front of the ownship aircraft would be displayed as an aircraft traffic indicator 210 on an appropriate flight level indication line 206 at a horizontal location to the right of the ownship indicator 208 that vertically aligns with a longitudinal separation distance 204 of 23 NM. It should be understood that the longitudinal separation distance 204 between a traffic aircraft and the ownship aircraft may represent the length of the horizontal component of the traffic aircraft's track as it is projected onto the flight level indication line 206 in front of or behind the ownship indicator 208. According to an alternative embodiment, the longitudinal separation distance 204 between a traffic aircraft and the ownship aircraft may represent the actual aircraft-to-aircraft separation as measured directly between the two aircraft in three-dimensional space.

It should be appreciated that the precise number of flight level indication lines 206, the number of longitudinal separation distance 204 reference values, and the corresponding ranges between values is a matter of preference. According to one embodiment, these characteristics of the aircraft traffic VPD 105 may be changed during flight via pilot input 116. For example, the pilot may utilize any input mechanism associated with the aircraft display 106 to zoom in or out, show more or fewer flight level indication lines 206, change the scale of the longitudinal separation distances 204, or any combination thereof.

The ownship indicator 208 is shown as a filled triangle in the center of the aircraft traffic VPD 105. All surrounding aircraft broadcasting applicable traffic flight data 110, via ADS-B or other technologies, are represented with aircraft traffic indicators 210A-210D (collectively referred to as aircraft traffic indicators 210) shown as open triangles. The location of each aircraft traffic indicator 210 is positioned on the corresponding flight level indication line 206 according to the longitudinal separation distance 204 in front of or behind the ownship indicator 208. With respect to the example shown in FIG. 2, each aircraft traffic indicator 210 is shown with the point of the triangle directed to the right, indicating that all aircraft traffic shown is flying a similar heading as the ownship aircraft. According to other embodiments, aircraft traffic flying a substantially opposite heading could be shown with the point of the triangle of the corresponding aircraft traffic indicator 210 directed to the left. It should be appreciated that the embodiments described herein are not limited to the use of triangular indicators 208 and 210, or the filled and open configurations of the triangular indicators 208 and 210, respectively, as shown.

Continuing with the example shown in FIG. 2, there are four traffic aircraft in the displayed vicinity around the ownship aircraft, or more specifically, 30 NMs in front of and behind the ownship aircraft, and 3 flight levels above and below the ownship aircraft. Two aircraft are located above the ownship aircraft. One of these aircraft is represented by the aircraft traffic indicator 210A on FL 370, positioned 10 NMs behind the ownship indicator 208, while the other is represented by the aircraft traffic indicator 210B on FL 350, positioned 23 NMs in front of the ownship indicator 208. Two aircraft are located below the ownship aircraft, one is represented by the aircraft traffic indicator 210C and shown to be 25 NMs behind the ownship indicator 208 at FL 330, and the other is represented by the aircraft traffic indicator 210D and shown approximately 17 NMs in front of the ownship indicator 208 at FL 310.

According to this embodiment, each displayed aircraft traffic indicator 210 includes a corresponding criteria indicator 118. The criteria indicator 118 is a horizontal line extending outward from the aircraft traffic indicator 210 in the direction of the ownship indicator 208. The criteria indicator 118 may include an endpoint and color that aids in the visualization of the precise location of the end of the criteria indicator 118. In the example shown, the endpoints are represented with diamond symbols.

The criteria indicators 118 allow a pilot to quickly view the aircraft traffic VPD 105 and determine whether a desired flight level change is possible. To do so, the pilot looks to see if a virtual vertical line drawn between the tip of the ownship indicator 208 and the flight level indication line 206 corresponding with the desired flight level intersects any criteria indicators 118. If it does, then there are blocking aircraft that prevent the climb or descent to the desired flight level due to separation minimums. If not, then there is no aircraft traffic that would prevent the desired climb and descent, which increases the likelihood that ATC will allow the flight level change if requested.

As an example, if the pilot of the ownship aircraft shown in FIG. 2 wants to climb to FL 370 from his or her current cruising altitude at FL 340, then a quick glance at the aircraft traffic VPD 105 would show that a line drawn upwards from the tip of the ownship indicator 208 to FL 370 would intersect the criteria indicator 118A extending outward from the aircraft traffic indicator 210A positioned on the flight level indication line 206 associated with FL 370. This tells the pilot that according to the closure rate between the two aircraft and the current speeds and positions of the aircraft, a climb to FL 370 would violate the minimum separation procedures. As will be described in greater detail below, the color or other characteristics of the criteria indicator 118A and/or the flight level indication line 206 associated with FL 370 may be used to inform the pilot at a glance as to whether or not a climb to FL 370 would be possible.

Using this same example, if the pilot of the ownship aircraft wanted to climb to FL 360, this would be possible since the only potentially blocking aircraft between the ownship aircraft and FL 360 is the aircraft depicted by the aircraft traffic indicator 210B on FL 350. However, because the corresponding criteria indicator 118B does not extend to or beyond the ownship indicator 208, then a safe climb through FL 350 while maintaining the proper separation minimums is possible. Utilizing these concepts, it should be clear that a descent to FL 330 or FL 320 would be possible since the criteria indicator 118C associated with the aircraft traffic indicator 210C does not extend to the ownship indicator 208, while a descent to or through FL 310 would not be possible due to the criteria indicator 118D corresponding to the aircraft traffic indicator 118D at FL 310.

It should be understood that the criteria indicators 118 may be displayed in any manner that indicates to the pilot that a climb or descent to or through the corresponding flight level indication line 206 is not possible. For example, rather than solid horizontal lines, the criteria indicators 118 may be flashing lines or may vary in thickness or color according to whether they are associated with blocking aircraft or are associated with aircraft having sufficient separation from the ownship aircraft. Alternatively, the criteria indicators 118 may not be horizontal lines. Rather, the indicators may include flashing the corresponding aircraft traffic indicator 210 in any color or otherwise highlighting the aircraft traffic indicator 210 and/or the corresponding flight level indication line 206 without utilizing criteria indicators 118 that are separate from the aircraft traffic indicators 210.

According to one exemplary embodiment shown in FIG. 2, the flight level indication lines 206 are displayed in varying colors and/or thicknesses depending on whether a climb or descent through the flight level indication line 206 is possible. For example, because the flight level indication lines 206 associated with FL 350 and FL 330 contain aircraft traffic, but a climb or descent through these flight levels is possible, they may be displayed as green broken lines (colors not shown in drawings). Because the flight level indication lines 206 associated with FL 360 and FL 320 do not contain aircraft traffic and a climb or descent through these flight levels is possible, they may be displayed as blue solid lines. Finally, because FL 370 and FL 310 are not available due to the blocking aircraft traffic, they are shown as red solid lines. The aircraft traffic indicators 210 may be displayed in a color corresponding to the applicable flight level indication line 206.

It should also be appreciated that any amount of flight data 212 may be displayed on the aircraft traffic VPD 105 as determined and selected by pilot input 116. For example, the pilot has chosen via an appropriate pilot interface to display the longitudinal separation and closure rates corresponding to the aircraft traffic occupying adjacent flight levels. As a result, the climb/descent determination module 104 displays this flight data 212 next to the aircraft traffic indicators 210B and 210C.

As discussed briefly above, the length of the criteria indicators 118 may be determined according to the traffic flight data 110, the ownship flight data 114, and any industry operational requirements, rules, or guidelines. For example, with respect to the aircraft traffic indicator 210B and corresponding criteria indicator 118B, the climb/descent determination module 104 may first determine the placement of the aircraft traffic indicator 210B on the aircraft traffic VPD 105 with respect to the ownship indicator 208. In determining the length of the criteria indicator 118B, the climb/descent determination module 104 determines the closure rate and longitudinal separation between the two aircraft, shown to be a 5 knot closing speed and a separation of 23 NM.

Using this information and the operational climbing rates for the ownship aircraft, the climb/descent determination module 104 may determine that at the current closure rate and separation, when the two aircraft are 10 NMs closer, the ownship aircraft would not be able to begin a standard climb to FL 350 without violating separation minimums. Accordingly, the climb/descent determination module 104 places the endpoint of the criteria indicator 118B at a position along the flight level indication line 206 that is 10 NM from the ownship indicator 208. It should be understood that the lengths of the criteria indicators 118, as well as the placement of the aircraft traffic indicators 210, are not static. Rather, as the flight environment changes, the climb/descent determination module 104 updates the aircraft traffic VPD 105 to provide the pilot with substantially real time information. Moreover, according to some embodiments, the precise lengths of the criteria indicators 118 may not provide substantial additional information to the pilot other than an overlapping criteria indicator 118 represents that a flight level change is not possible, while a non-overlapping criteria indicator 118 represents that a flight level change is possible with proper authorization.

Figure 3:
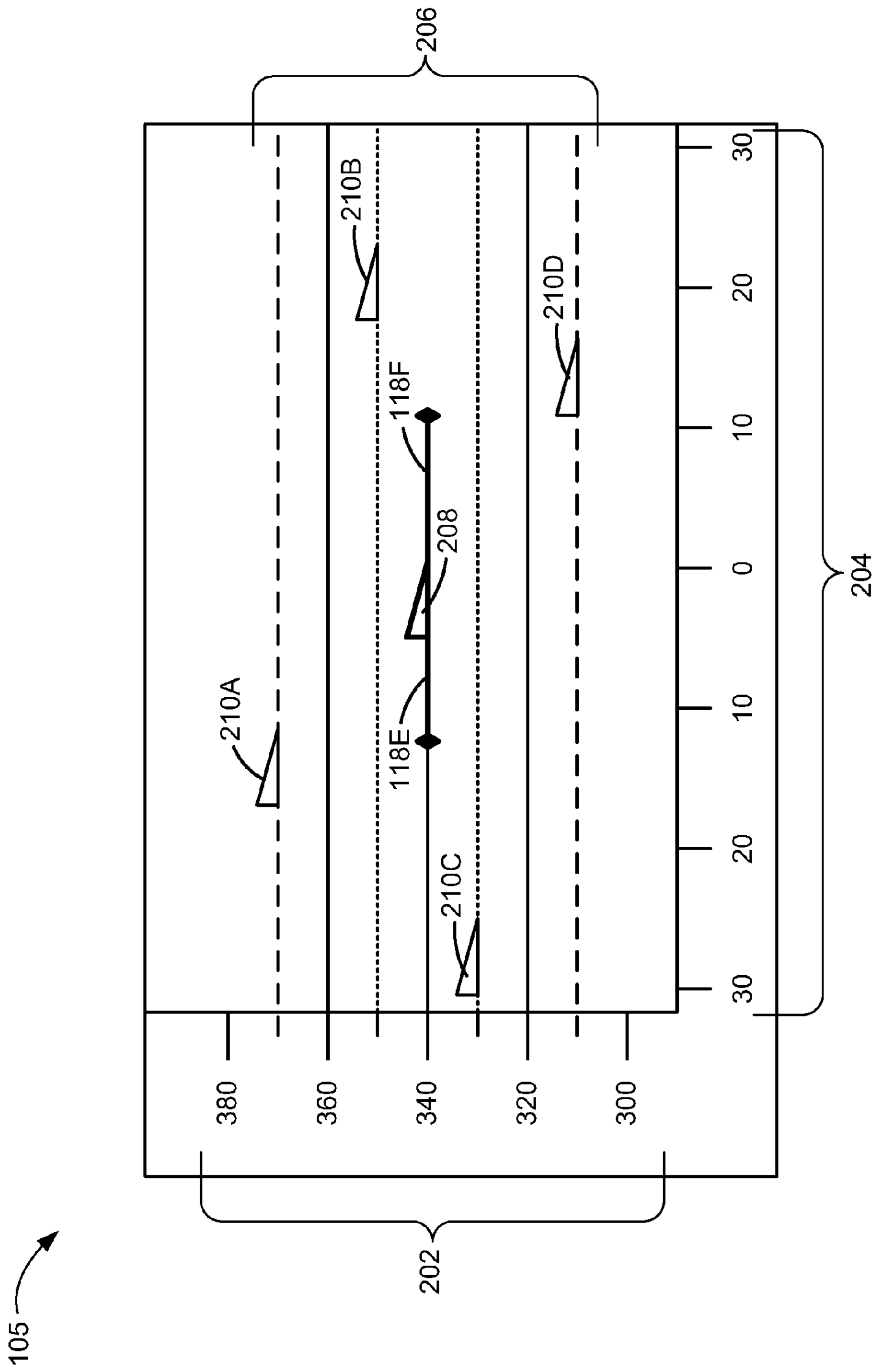
FIG. 3 is a display diagram showing an alternative aircraft traffic VPD according to embodiments presented herein.

FIG. 3 shows an alternative embodiment in which the criteria indicator 118 is associated with the ownship indicator 208 rather than the aircraft traffic indicators 210. According to this embodiment, a criteria indicator 118E extends rearward from the ownship indicator 208 and a criteria indicator 118F extends forward from the ownship indicator 208. The criteria indicator 118E corresponds to the aircraft traffic indicators 210A and 210C behind the ownship indicator 208, while the criteria indicator 118F corresponds to the aircraft traffic indicators 210B and 210D in front of the ownship indicator. When creating the criteria indicator 118E, the climb/descent determination module 104 utilizes traffic flight data 110 received from both of the aircraft associated with the aircraft traffic indicators 210A and 210C. Similarly, when creating the criteria indicator 118F, the climb/descent determination module 104 utilizes traffic flight data 110 received from both of the aircraft associated with the aircraft traffic indicators 210B and 210D.

According to the example shown in FIG. 3, because the criteria indicator 118E vertically overlaps the aircraft traffic indicator 210A, a climb to or through FL 370 would not possible without violating separation minimums. However, because the criteria indicator 118E does not vertically overlap the aircraft traffic indicator 210C, it would be possible for the pilot of the ownship aircraft to descend through FL 330. Similarly, the criteria indicator 118F informs the pilot at a glance that a descent to FL 310 is not possible, while a climb through FL 350 would be possible. According to one embodiment, the configuration of the aircraft traffic VPD 105 with regards to the placement of the criteria indicators 118 is selectable according to pilot preference. Utilizing an interface associated with the aircraft display 106, the pilot may switch between configurations as desired.

Figure 4:
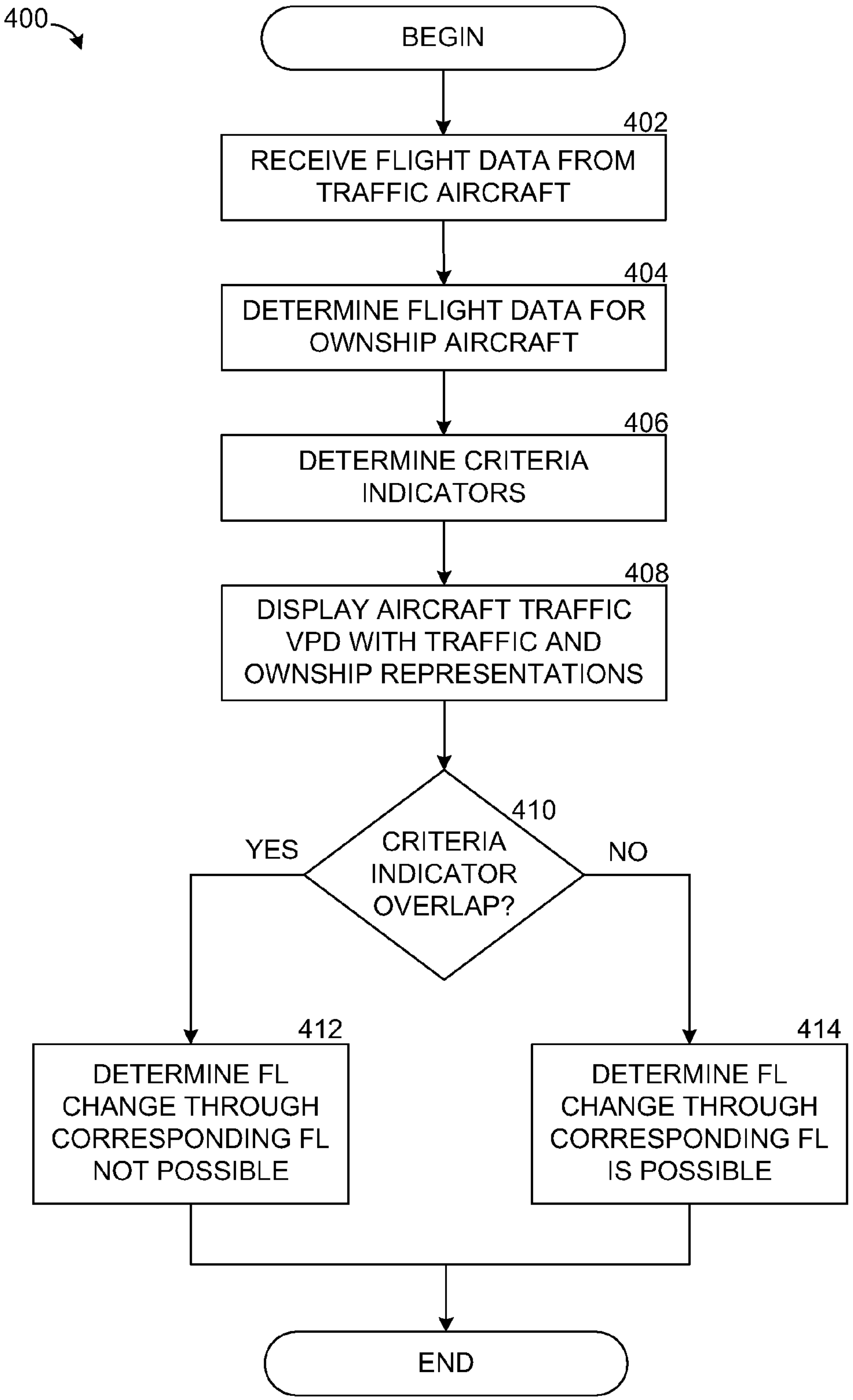
FIG. 4 is a flow diagram illustrating one method for displaying aircraft traffic and climb/descent determination data, as provided in the embodiments presented herein.

FIG. 4 shows a routine 400 for displaying in-flight traffic and climb/descent information on an aircraft display 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the climb/descent determination module 104 receives traffic flight data 110 from one or more traffic aircraft in the vicinity of the ownship aircraft. As described above, the traffic flight data 110 may be received at an ADS-B receiver 108. At operation 404, the ownship flight data 114 is determined from one or more sensors 112, flight computers, or other avionics components. The traffic flight data 110 and the ownship flight data 114 is used by the climb/descent determination module 104 at operation 406 to determine the characteristics of the criteria indicators 118, such as the line direction, length, color, line type and weight, and any other applicable characteristics.

From operation 406, the routine 400 continues to operation 408, where the climb/descent determination module 104 creates and displays the aircraft traffic VPD 105. This operation includes displaying the flight level indication lines 206, the ownship indicator 208, the applicable aircraft traffic indicators 210, and the corresponding criteria indicators 118. The routine 400 continues from operation 408 to operation 410, where a determination is made for a desired flight level change as to whether the criteria indicators 118 vertically overlap the ownship indicator 208 or an aircraft traffic indicator 210, depending on the configuration of the aircraft traffic VPD 105 as described above with respect to the two embodiments shown in FIGS. 2 and 3.

If a criteria indicator 118 overlaps the ownship indicator 208 or an aircraft traffic indicator 210, then the routine 400 proceeds to operation 412, where it is determined that the desired flight level change is not possible and the routine 400 ends. However, if the climb/descent determination module 104 determines at operation 410 that the criteria indicator 118 does not overlap the ownship indicator 208 or an aircraft traffic indicator 210, then the routine 400 proceeds to operation 414, where it is determined that the desired flight level change is possible and the routine 400 ends. If the aircraft traffic VPD 105 shows that the desired flight level change is possible, the pilot knows that requesting the change with ATC is likely to lead to the desired authorization.

Figure 5:
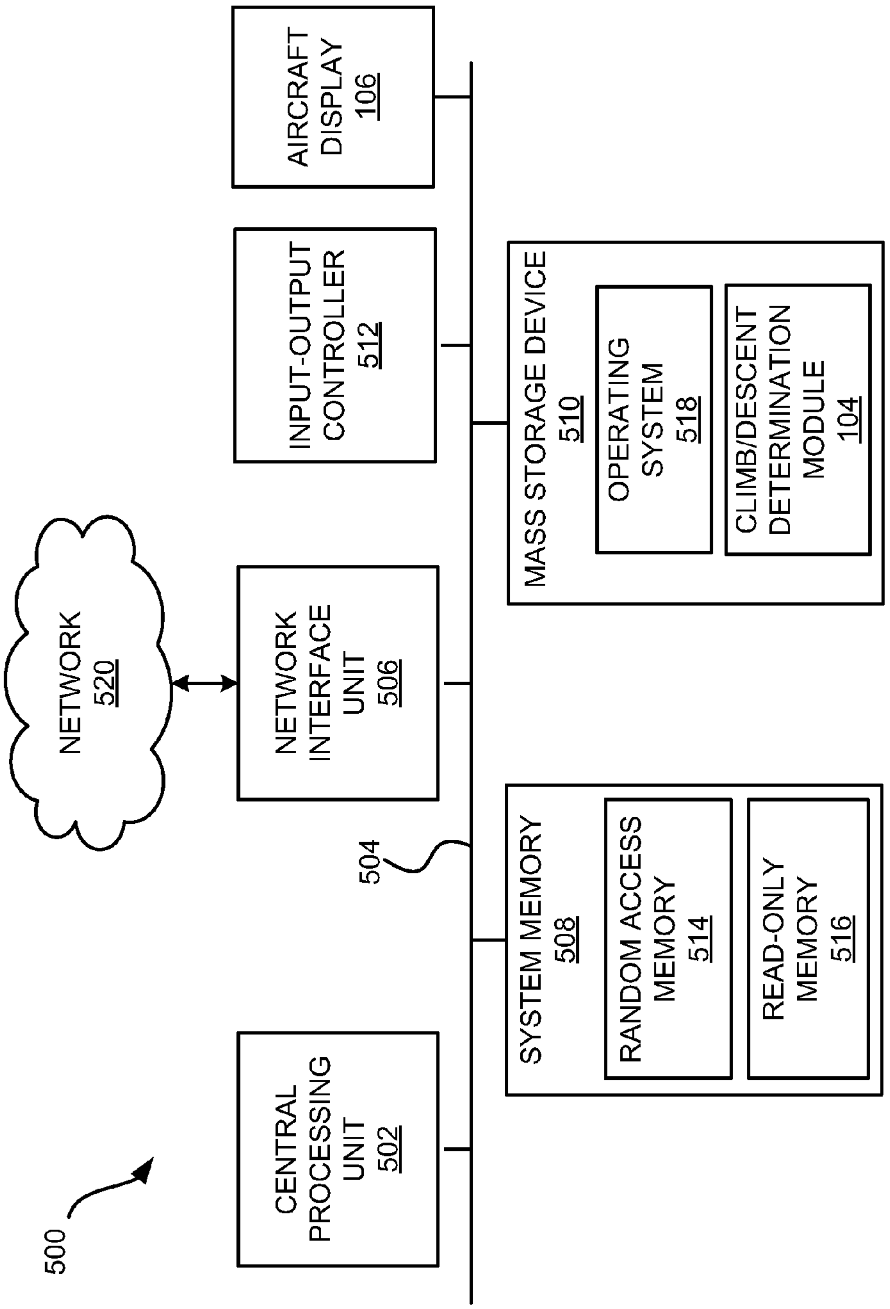
FIG. 5 is a block diagram showing an illustrative computer hardware and software architecture for a computing system capable of implementing aspects of the embodiments presented herein.

FIG. 5 shows an illustrative computer architecture for a traffic management computer 102 capable of executing the software components described herein for displaying aircraft traffic and climb/descent information in the manner presented above. The computer architecture shown in FIG. 5 illustrates a conventional general-purpose computer system that may be utilized to execute aspects of the software components presented herein, such as a flight management computer found in a typical commercial aircraft.

The computer architecture shown in FIG. 5 includes a central processing unit 502 (CPU), a system memory 508, including a random access memory 514 (RAM) and a read-only memory 516 (ROM), and a system bus 504 that couples the memory to the CPU 502. The traffic management computer 102 also includes a mass storage device 510 for storing an operating or control system 518, specific application modules, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the traffic management computer 102. Although the description of computer-readable media contained herein refers to a mass storage device, such as a hard disk or CD-ROM drive, it should be appreciated by those skilled in the art that computer-readable media can be any available computer storage media that can be accessed by the traffic management computer 102.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the traffic management computer 102.

According to various embodiments, the traffic management computer 102 may operate in a networked environment using logical connections to other aircraft systems and remote computers through a network such as the network 520. The traffic management computer 102 may connect to the network 520 through a network interface unit 506 connected to the bus 504. It should be appreciated that the network interface unit 506 may also be utilized to connect to other types of networks and remote computer systems. The traffic management computer 102 may also include an input/output controller 512 for receiving and processing input from a number of other devices, including a keyboard, mouse, electronic stylus, or touchscreen, such as may be present on a connected terminal device in the aircraft. Similarly, an input/output controller 512 may provide output to an aircraft display 106, a printer, or other type of output device.

As mentioned briefly above, a number of program modules and data files may be stored in the mass storage device 510 and RAM 514 of the traffic management computer 102. The mass storage device 510 and RAM 514 may also store one or more program modules. In particular, the mass storage device 510 and the RAM 514 may store the climb/descent determination module 104, which was described in detail above in regard to FIG. 1. The mass storage device 510 and the RAM 514 may also store other types of program modules or data.

Based on the foregoing, it should be appreciated that technologies for displaying aircraft traffic and climb/descent information on a display in an aircraft are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing in-flight traffic information corresponding to an aircraft and a traffic aircraft, comprising:

receiving at a traffic management computer, flight data associated with the traffic aircraft from the traffic aircraft;

determining by the traffic management computer, flight data associated with the aircraft;

utilizing by the traffic management computer, the flight data associated with the traffic aircraft and the flight data associated with the aircraft to determine characteristics of a single criteria indicator corresponding to both a longitudinal separation and a closure rate between the traffic aircraft and the aircraft, the characteristics of the single criteria indicator comprising line direction and length;

providing by the traffic management computer, a plurality of altitude indication lines for display on a display unit of the aircraft;

providing by the traffic management computer, an ownship representation on an altitude indication line determined from the flight data associated with the aircraft;

providing by the traffic management computer, an aircraft traffic representation on an altitude indication line determined from the flight data associated with the traffic aircraft; and providing by the traffic management computer, the single criteria indicator for display on the display unit such that the characteristics of the single criteria indicator with respect to the ownship representation and the aircraft traffic representation indicates whether an altitude change of the aircraft through an altitude corresponding to the altitude indication line of the traffic aircraft is possible.

2. The computer-implemented method of claim 1, wherein receiving flight data associated with the traffic aircraft from the traffic aircraft comprises receiving Automatic Dependent Surveillance Broadcast (ADS-B) data from the traffic aircraft at an ADS-B receiver of the aircraft communicatively coupled to the traffic management computer.

3. The computer-implemented method of claim 1, wherein flight data comprises at least altitude, heading, and speed.

4. The computer-implemented method of claim 1, wherein the ownship representation and the aircraft traffic representation are displayed a horizontal distance apart that corresponds to the longitudinal separation between the aircraft and the traffic aircraft.

5. The computer-implemented method of claim 1, wherein the plurality of altitude indication lines comprises a number of parallel horizontal lines representing flight levels.

6. The computer-implemented method of claim 5, wherein the number is selectable during flight according to pilot preference, and wherein providing by the traffic management computer the number of parallel horizontal lines representing flight levels for display on the display unit comprises receiving a selection of the number of flight levels for display at the traffic management computer, and providing by the traffic management computer the number of parallel horizontal lines representing flight levels for display on the display unit according to the selection.

7. The computer-implemented method of claim 1, wherein the single criteria indicator comprises a horizontal line extending the length from the traffic aircraft along the altitude indication line toward the ownship representation, the length corresponding at least to the closure rate between the traffic aircraft and the aircraft.

8. The computer-implemented method of claim 7, wherein the traffic aircraft comprises all aircraft within a predetermined longitudinal distance from the aircraft associated with the ownship representation such that providing by the traffic management computer the aircraft traffic representation on the altitude indication line comprises providing by the traffic management computer an aircraft traffic representation for each of the traffic aircraft on a corresponding altitude indication line according to the longitudinal separation of each of the traffic aircraft and the aircraft associated with the ownship representation, and wherein providing by the traffic management computer the single criteria indicator for display on the display unit comprises providing by the traffic management computer one or more horizontal lines from each of the aircraft traffic representations toward the ownship representation according to the closure rate between a corresponding traffic aircraft and the aircraft associated with the ownship representation.

9. The computer-implemented method of claim 1, wherein the single criteria indicator comprises a horizontal line extending the length from the ownship representation along the altitude indication line toward the aircraft traffic representation, the length corresponding at least to the closure rate between the traffic aircraft and the aircraft.

10. The computer-implemented method of claim 9, wherein the traffic aircraft comprises all aircraft within a predetermined longitudinal distance from the aircraft associated with the ownship representation such that providing by the traffic management computer the aircraft traffic representation on the altitude indication line comprises providing by the traffic management computer an aircraft traffic representation for each of the traffic aircraft on a corresponding altitude indication line according to the longitudinal separation of each of the traffic aircraft and the aircraft associated with the ownship representation, and wherein providing by the traffic management computer the single criteria indicator for display on the display unit comprises providing by the traffic management computer a horizontal line forward and aft from the ownship representation according to the closure rate between the aircraft associated with the ownship representation and traffic aircraft.

11. The computer-implemented method of claim 1, wherein the single criteria indicator comprises a horizontal line extending the length corresponding to the closure rate, the wind direction and velocity at a plurality of altitudes, and longitudinal separation minimum distances.

12. The computer-implemented method of claim 1, wherein the single criteria indicator comprises a horizontal line extending the length from the aircraft traffic representation or the ownship representation, the method further comprising:

determining by the traffic management computer whether the single criteria indicator vertically overlaps the ownship representation or the aircraft traffic representation;

if the single criteria indicator vertically overlaps the ownship representation or the aircraft traffic representation, then providing by the traffic management computer a notification that the altitude change of the aircraft through the altitude corresponding to the altitude indication line of the traffic aircraft is not possible; and if the single criteria indicator does not vertically overlap the ownship representation or the aircraft traffic representation, then providing by the traffic management computer a notification that the altitude change of the aircraft through the altitude corresponding to the altitude indication line of the traffic aircraft is possible.

13. The computer-implemented method of claim 12, wherein providing by the traffic management computer a notification that altitude change of the aircraft through the altitude corresponding to the altitude indication line of the traffic aircraft is not possible comprises displaying the altitude indication line of the traffic aircraft in a first color, and wherein providing by the traffic management computer a notification that the altitude change of the aircraft through the altitude corresponding to the altitude indication line of the traffic aircraft is possible comprises displaying the altitude indication line associated with the traffic aircraft in a second color.

14. The computer-implemented method of claim 1, further comprising providing by the traffic management computer a longitudinal separation or closure rate value proximate to the traffic aircraft on the display unit.

15. A system for providing in-flight traffic information corresponding to an aircraft and a traffic aircraft, the system comprising:

a memory of a traffic management computer for storing a program containing computer-executable instructions for providing in-flight traffic information; and a processing unit of the traffic management computer functionally coupled to the memory, the processing unit being responsive to the computer-executable instructions and configured to:

receive flight data associated with the traffic aircraft from the traffic aircraft, determine flight data associated with the aircraft, utilize the flight data associated with the traffic aircraft and the flight data associated with the aircraft to determine a criteria indicator comprising a horizontal line, the length of which is determined at least according to both a longitudinal separation and a closure rate between the traffic aircraft and the aircraft, and provide the criteria indicator to a display unit for display.

16. The system of claim 15, further comprising:

an ADS-B receiver configured to receive the flight data associated with the traffic aircraft from the traffic aircraft, wherein the flight data associated with the traffic aircraft comprises ADS-B flight data; and the display unit in a cockpit of the aircraft.

17. The system of claim 16, wherein the processing unit is further configured to:

display a plurality of flight level indication lines on the display unit, display an ownship representation on a flight level indication line determined from the flight data associated with the aircraft, display an aircraft traffic representation on a flight level indication line determined from the flight data associated with the traffic aircraft, and display the criteria indicator on the display unit such that a position of the criteria indicator with respect to the ownship representation and the aircraft traffic representation indicates whether a flight level change of the aircraft through a flight level corresponding to the flight level indication line of the traffic aircraft is possible.

18. The system of claim 17, wherein the criteria indicator comprises the horizontal line extending a horizontal length from the traffic aircraft along the flight level indication line associated with the traffic aircraft toward the ownship representation, and wherein the processing unit is further configured to:

determine whether the criteria indicator vertically overlaps the ownship representation;

if the criteria indicator vertically overlaps the ownship representation, then indicate that the flight level change of the aircraft through the flight level corresponding to the flight level indication line of the traffic aircraft is not possible by displaying the flight level indication line of the traffic aircraft in a first color; and if the criteria indicator does not vertically overlap the ownship representation, then indicate that the flight level change of the aircraft through the flight level corresponding to the flight level indication line of the traffic aircraft is possible by displaying the altitude indication line associated with the traffic aircraft in a second color.

19. A non-transitory computer-readable medium comprising computer-executable instructions that, when executed by a traffic management computer, cause the traffic management computer to:

receive flight data associated with a traffic aircraft from the traffic aircraft;

determine flight data associated with the aircraft;

utilize the flight data associated with the traffic aircraft and the flight data associated with the aircraft to determine a criteria indicator comprising a horizontal line, the length of which is determined at least according to both a longitudinal separation and a closure rate between the traffic aircraft and the aircraft; and provide the criteria indicator to a display unit for display.

20. The non-transitory computer-readable medium of claim 19, comprising further computer-executable instructions that cause the traffic management computer to:

display a plurality of flight level indication lines on the display unit;

display an ownship representation on a flight level indication line determined from the flight data associated with the aircraft;

display an aircraft traffic representation on a flight level indication line determined from the flight data associated with the traffic aircraft; and display the criteria indicator on the display unit such that a position of the criteria indicator with respect to the ownship representation and the aircraft traffic representation indicates whether a flight level change of the aircraft through a flight level corresponding to the flight level indication line of the traffic aircraft is possible.

21. The non-transitory computer-readable medium of claim 20, comprising further computer-executable instructions that cause the traffic management computer to:

determine whether the criteria indicator vertically overlaps the ownship representation or the aircraft traffic representation;

if the criteria indicator vertically overlaps the ownship representation or the aircraft traffic representation, then indicate that the flight level change of the aircraft through the flight level corresponding to the flight level indication line of the traffic aircraft is not possible by displaying the flight level indication line of the traffic aircraft in a first color; and if the criteria indicator does not vertically overlap the ownship representation or the aircraft traffic representation, then indicate that the flight level change of the aircraft through the flight level corresponding to the flight level indication line of the traffic aircraft is possible by displaying the altitude indication line associated with the traffic aircraft in a second color.

22. The computer-implemented method of claim 1, wherein the criteria indicator comprises a horizontal line extending a horizontal length from at least one of an aircraft traffic representation associated with the traffic aircraft and an ownship representation associated with the aircraft such that the horizontal length corresponds to at least the closure rate between the traffic aircraft and the aircraft.

* * * * *